United States Patent
Chen et al.

(10) Patent No.: US 9,837,051 B2
(45) Date of Patent: Dec. 5, 2017

(54) ELECTRONIC DEVICE AND METHOD FOR ADJUSTING IMAGES PRESENTED BY ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jun Chen, Shenzhen (CN); Cheng-Ching Chien, New Taipei (TW); Po-Hua Lin, New Taipei (TW); Jun-Jin Wei, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 281 days.

(21) Appl. No.: 14/797,607

(22) Filed: Jul. 13, 2015

(65) Prior Publication Data

US 2016/0163024 A1 Jun. 9, 2016

(30) Foreign Application Priority Data

Dec. 4, 2014 (CN) .......................... 2014 1 0734617

(51) Int. Cl.
*G09G 5/00* (2006.01)
*G09G 5/38* (2006.01)
*G06F 3/01* (2006.01)
*G06F 3/0484* (2013.01)
*G06K 9/00* (2006.01)

(52) U.S. Cl.
CPC ............... *G09G 5/38* (2013.01); *G06F 3/013* (2013.01); *G06F 3/04845* (2013.01); *G06K 9/00604* (2013.01); *G09G 5/00* (2013.01); *G09G 2320/08* (2013.01); *G09G 2340/0492* (2013.01); *G09G 2354/00* (2013.01); *G09G 2358/00* (2013.01)

(58) Field of Classification Search
None
See application file for complete search history.

(56) References Cited

U.S. PATENT DOCUMENTS

2014/0161313 A1* 6/2014 Ohishi ............... G06K 9/00604
382/103
2015/0042556 A1* 2/2015 Tao .......................... G06F 3/012
345/156

* cited by examiner

*Primary Examiner* — William Beutel
(74) *Attorney, Agent, or Firm* — Steven Reiss (57) ABSTRACT

An electronic device and a method generate a first model and a second model when the images presented by the electronic device are viewed by a user located at a reference location. The electronic device obtains an image of the user captured by a camera of the electronic device when the user views the images presented by the electronic device. The electronic device generates a third model according to the image of the user. The electronic device adjusts the images presented by the electronic device when the third model does not match the first model.

9 Claims, 8 Drawing Sheets

ELECTRONIC DEVICE AND METHOD FOR ADJUSTING IMAGES PRESENTED BY ELECTRONIC DEVICE

CROSS-REFERENCE TO RELATED APPLICATIONS

This application claims priority to Chinese Patent Application No. 201410734617.6 filed on Dec. 4, 2014, the contents of which are incorporated by reference herein.

FIELD

Embodiments of the present disclosure relate to image processing technology, and particularly to an electronic device and a method for the electronic device to adjust images.

BACKGROUND

Images (for example, movies, videos, pictures, or the like) are played in electronic devices. However, the images are typically played at a fixed displaying area of the electronic device. In other words, the images played in the electronic device are not oriented according to a position of eyes of a user.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable median include CDs, DVDs, BLU-RAY™, flash memory, and hard disk drives. The term "comprising" means "including, but not necessarily limited to"; it specifically indicates open-ended inclusion or membership in a so-described combination, group, series and the like.

Figure 1:
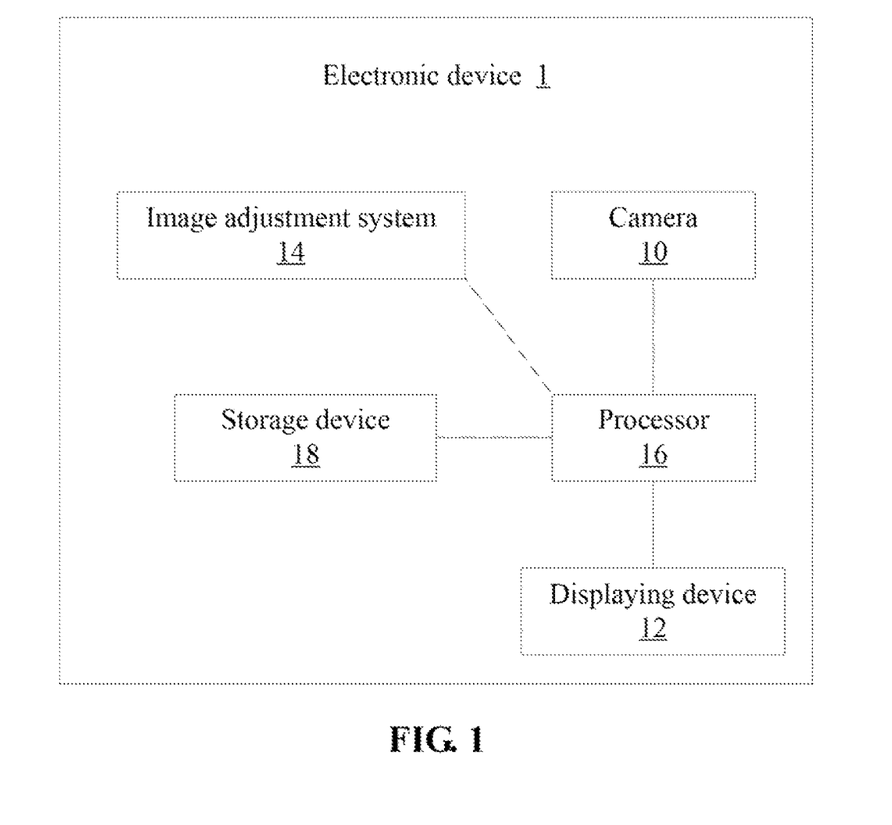
FIG. 1 is a block diagram of an exemplary embodiment of an image adjustment system included in an electronic device.

FIG. 1 is a block diagram of one embodiment of an image adjustment system 14 included in an electronic device 1. The electronic device 1 includes, but is not limited to, a camera 10, a displaying device 12, an image adjustment system 14, at least one processor 16, and a storage device 18. FIG. 1 illustrates only one example of the electronic device 1, other examples can comprise more or fewer components than those shown in the embodiment, or have a different configuration of the various components. The electronic device 1 can be, but is not limited to, a mobile phone, a tablet computer, a personal digital assistant (PDA), a personal computer or any other electronic devices which provide functions of network connections.

Figure 2:
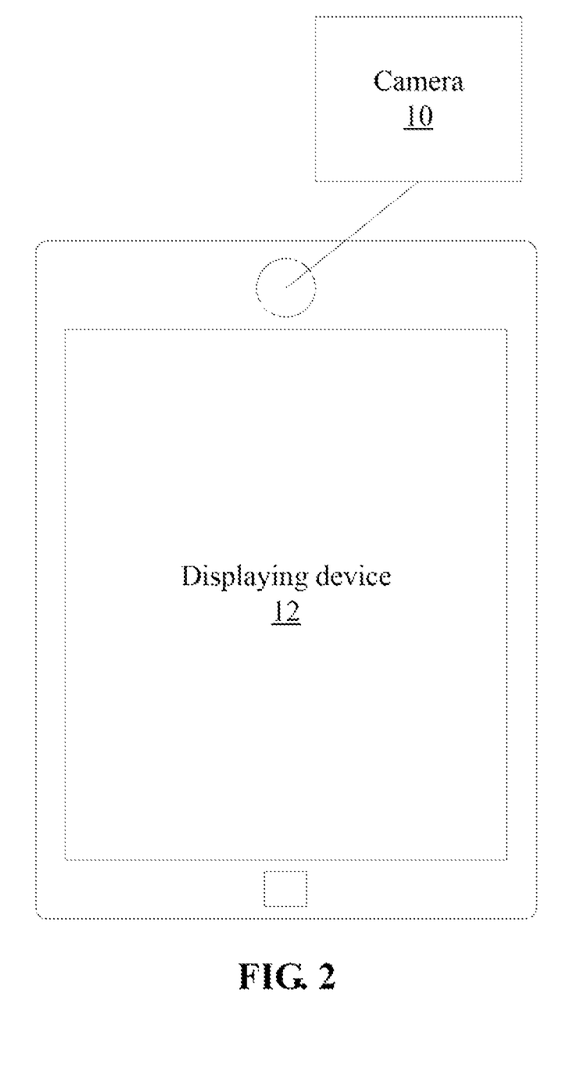
FIG. 2 shows a diagrammatic view of an exemplary embodiment of the electronic device.

In at least one embodiment, the camera 10 can be, but is not limited to, a digital video camera. The camera 10 can be inbuilt in the electronic device 1, for example, as shown in FIG. 2, the camera 10 is located at the top of a frontal panel of the electronic device 1. The camera 10 also can be an external device connected to the electronic device 1 via a wireless connection (for example, a WIFI connection or a BLUETOOTH connection) or a cable (for example, a universal serial bus cable). The camera 1 captures images of a user when the user is holding the electronic device 1 and viewing images (for example, a movie, a video or the like) presented by the electronic device 1.

In at least one embodiment, the displaying device 12 is located at a front side of the electronic device as shown in FIG. 2. The displaying device 12 displays the images presented by the electronic device 1.

In at least one embodiment, the storage device 18 can be an internal storage device, such as a flash memory, a random access memory (RAM) for temporary storage of parameters, and/or a read-only memory (ROM) for permanent storage of parameters. The storage device 18 can also be an external storage device, such as an external hard disk, a storage card, or a data storage medium. The at least one processor 16 can be a central processing unit (CPU), a microprocessor, or other data processor chip that performs functions of the electronic device 1.

Figure 3:
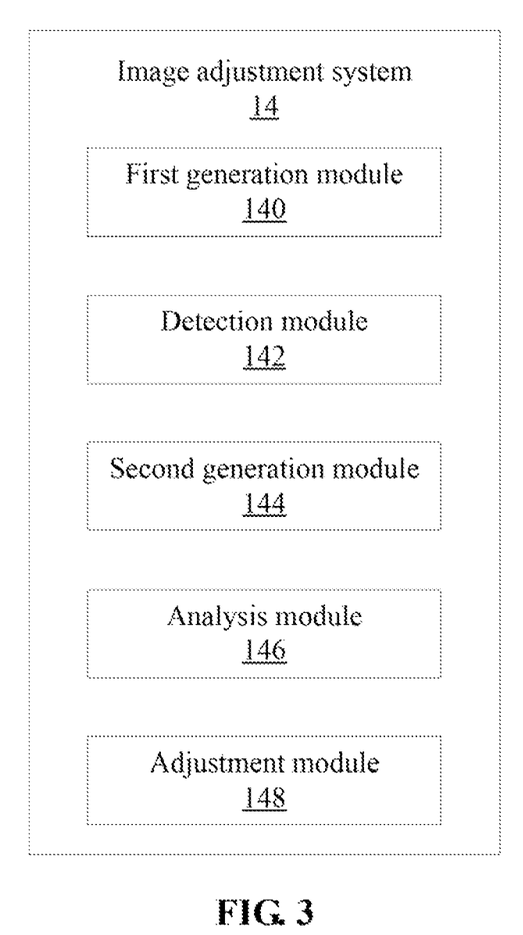
FIG. 3 is a block diagram of one embodiment of the image adjustment system.

FIG. 3 is a block diagram of one embodiment of the image adjustment system 14. The image adjustment system 14 comprises, but is not limited to, a first generation module 140, a detection module 142, a second generation module 144, an analysis module 146, and an adjustment module 148. Modules 140-148 can comprise computerized instructions in the form of one or more computer-readable programs that can be stored in a non-transitory computer-readable medium, for example the storage device 18, and executed by the at least one processor 16 of the electronic device 1. A detailed description of the functions of the modules 140-148 is given below in reference to FIG. 4.

Figure 4:
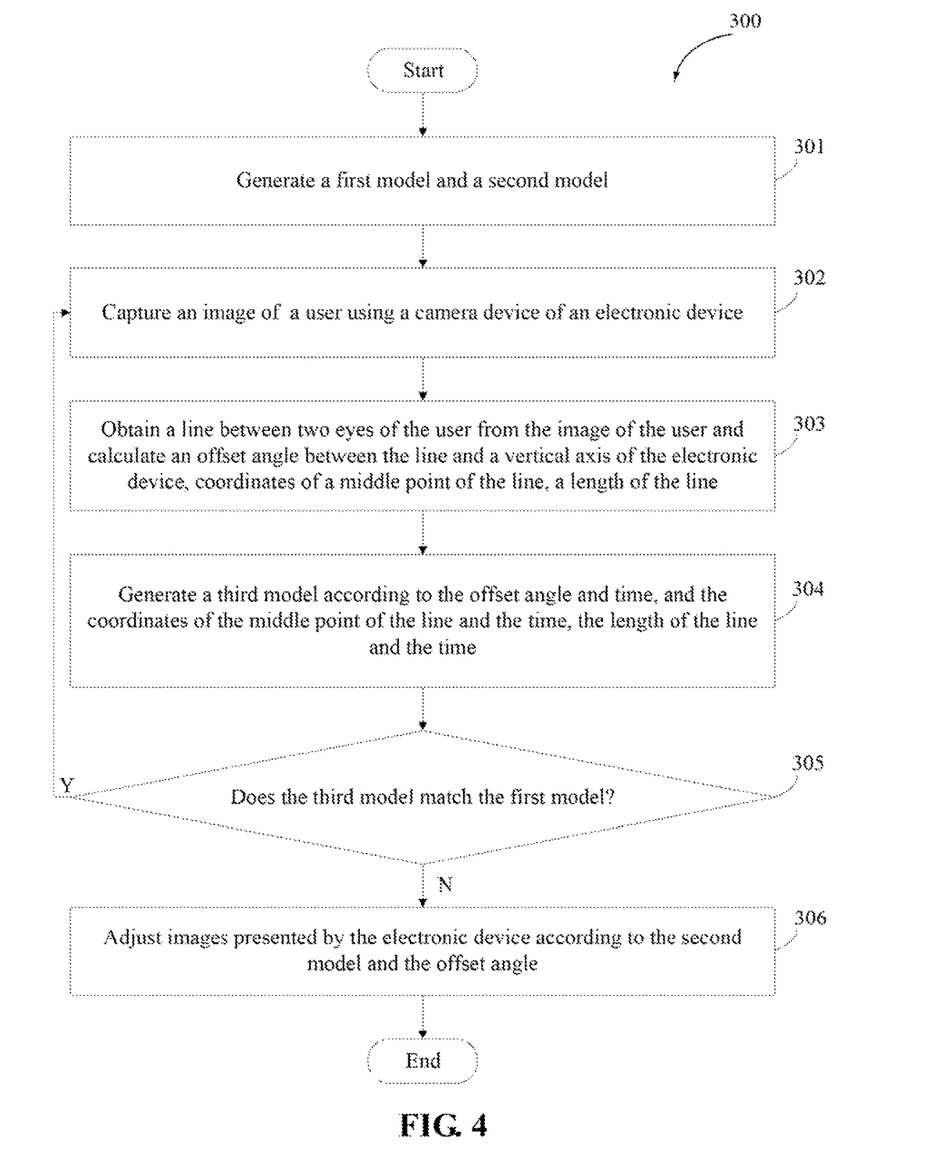
FIG. 4 is a flowchart of an exemplary embodiment of a method for adjusting images presented by the electronic device.

FIG. 4 illustrates a flowchart of an example embodiment of a method for adjusting images presented by the electronic device. In an example embodiment, the method is performed by execution of computer-readable software program codes or instructions by at least one processor of the electronic device.

Referring to FIG. 4, a flowchart is presented in accordance with an example embodiment. The method 300 is provided by way of example, as there are a variety of ways to carry out the method. The method 300 described below can be carried out using the configurations illustrated in FIGS. 1-4, for example, and various elements of these figures are referenced in explaining method 300. Each block shown in FIG. 4 represents one or more processes, methods, or subroutines, carried out in the method 300. Furthermore, the illustrated order of blocks is illustrative only and the order of the blocks can be changed. Additional blocks can be added or fewer blocks can be utilized without departing from this disclosure. The example method 300 can begin at block 301.

Figure 5:
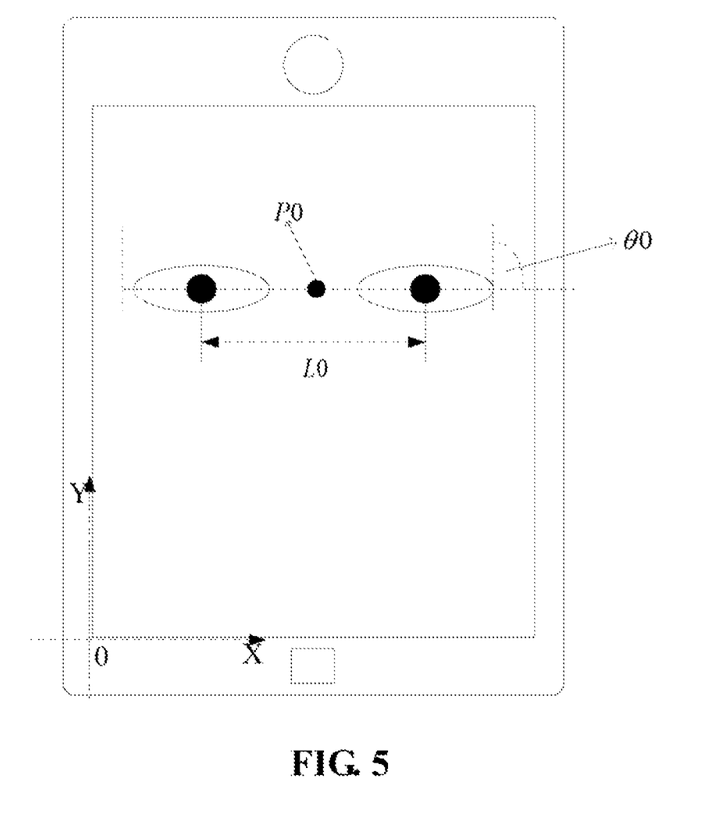
FIG. 5 shows a diagrammatic view of an exemplary embodiment of a first model when the images presented by the electronic device are viewed by a user located at a reference location.
Figure 6:
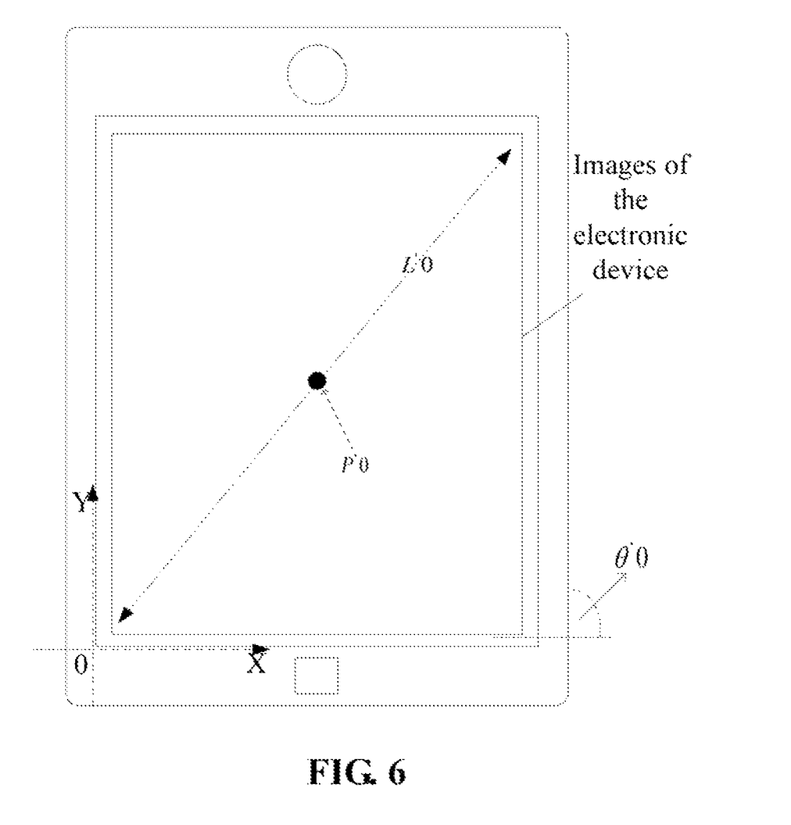
FIG. 6 shows a diagrammatic view of an exemplary embodiment of a second model when the images presented by the electronic device are viewed by the user located at the reference location.

At block 301, the first generation module generates a first model and a second model when images presented by the electronic device are being viewed by a user located at a reference location. In at least one embodiment, the images being watched (for example, pictures, movies, videos or the like) are visible on the displaying device, and the camera captures a reference image of the user located at the reference location. The first model is obtained from the reference image of the user located at the reference location. In detail, two eyes of the user are obtained using a face recognition technology, and a reference line is drawn to connect the two eyes of the user. The first model is generated when the three following conditions are satisfied: (1) the reference line between the two eyes of the user is parallel to an abscissa axis of the electronic device (also regarded as X axis of the electronic device), and vertical to a vertical axis of the electronic device (also regarded as Y axis of the electronic device); (2) coordinates of a reference middle point of the reference line, as a reference, are predetermined; (3) a length of the reference line is predetermined. For example, as shown in FIG. 5, the first model includes an angle θ0 between the Y axis of the electronic device and the reference line between the two eyes of the user, the angle θ0=90°, a reference middle point P0 of the reference line between the two eyes of the user, and a length L0 of the reference line between the two eyes of the user. The second model is generated when the three following conditions are satisfied: (1) a reference horizontal line drawn on the images of the electronic device is parallel to the abscissa axis of the electronic device, and vertical to the vertical axis of the electronic device; (2) a reference central point of the images of the electronic device is predetermined; (3) a length of a reference diagonal line of the images of the electronic device is predetermined. For example, as shown in FIG. 6, the second model includes an angle θ'0 generated between the Y axis of the electronic device and the reference horizontal line of the images of the electronic device, the angle θ'0=90°, a reference central point P'0 of the images of the electronic device, and a length L'0 of the reference diagonal line of the images of the electronic device.

At block 302, a detection module obtains an image of the user captured by the camera of the electronic device when the user views the images presented by the electronic device.

Figure 7:
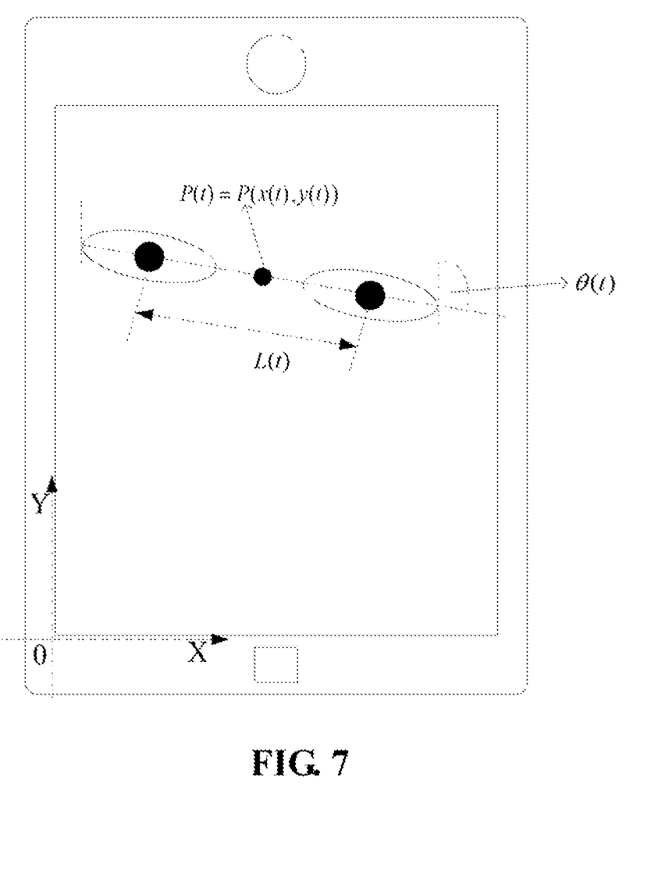
FIG. 7 shows a diagrammatic view of an exemplary embodiment of a third model when the user views the images presented by the electronic device

At block 303, the detection module obtains a line between two eyes of the user from the image of the user, and calculates an offset angle between the line and the vertical axis of the electronic device, coordinates of a middle point of the line, and a length of the line. In at least one embodiment, the image of the user is detected by the face recognition technology to obtain features of the user, such as, two eyes of the user. The line between the two eyes of the user is calculated according to positions of the two eyes of the user. The middle point of the line is calculated according to the line between the two eyes. The length of the line is calculated according to positions of the two eyes of the user. As shown in FIG. 7, the offset angle is donated as following θ(t), the coordinates of the middle point of the line is donated as following P(t)=P(x(t), y(t)), the distance of the line is donated as following L(t).

At block 304, a second generation module generates a third model according to the offset angle, the coordinates of the middle point of the line, and the length of the line. The third model specifies θ(t), P(t)=P(x(t), y(t)), and the L(t) as calculations. As shown in FIG. 7, θ(t) represents the offset angle, P(t)=P(x(t), y(t)) represents the coordinates of the middle point of the line, and L(t) represents the length of the line.

At block 305, a determination module determines if the third model matches the first model. In at least one embodiment, if the third model matches the first model, the procedure returns to block 302. Otherwise, if the third model does not match the first model, for example, the offset angle θ(t) is not equal to 90°, the procedure goes to block 306.

Figure 8:
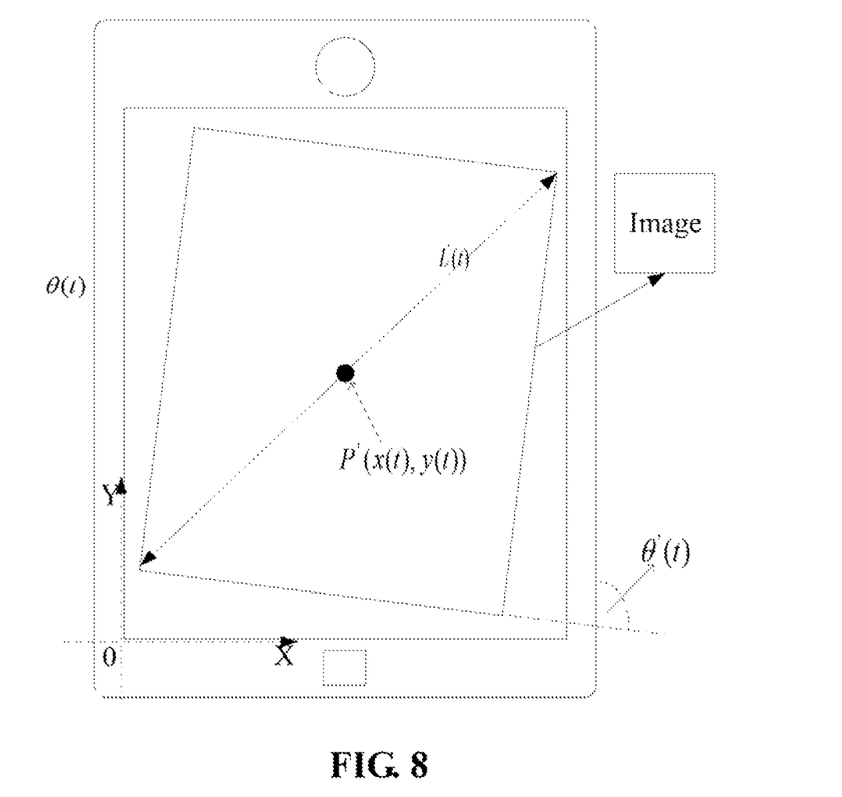
FIG. 8 shows a diagrammatic view of an exemplary embodiment of an image adjusting process using the method of the present disclosure.

At block 305, an adjustment module adjusts the images presented by the electronic device according to the second model and the offset angle. In at least one embodiment, as shown in FIG. 8, the images presented by the electronic device are adjusted when three conditions are satisfied as following: (1) L(t)/L'0=k*L0/L(t), L'(t) is a length to an adjusted diagonal line of the images presented by the electronic device, L'0 is the length of the reference diagonal line of the images presented by the electronic device, L0 is the length of the reference line between the two eyes of the user, L(t) is the length of the line between the two eyes of the user, and k is a constant value; (2) θ(t)=θ(t), θ (t) is an adjusted angle, and θ(t) is the offset angle between the line and the vertical axis of the electronic device; (3) (x(t), y(t))−P'0=(x(t), y(t))−P0, (x(t), y(t)) is coordinates of an adjusted central point of the images presented by the electronic device, P'0 is the reference central point of the images presented by the electronic device, P (x(t), y(t)) is the coordinates of the middle point of the line, P0 is the reference middle point of the reference line. The images presented by the electronic device are rotated according to the offset angle between the line and the vertical axis of the electronic device. That is, the horizontal line of the images presented by the electronic device is parallel to the line between the two eyes of the user. In addition, an adjustment of the images presented by the electronic device is triggered when the offset angle is greater than a predetermined value (for example, five degrees). Furthermore, the adjustment of the images presented by the electronic device is triggered when a predetermined time (for example, three seconds) elapses following an earlier adjustment.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An electronic device comprising:
   at least one processor; and
   a storage device that stores one or more programs, which when executed by the at least one processor, cause the at least one processor to:
   generate, when images presented by the electronic device are viewed by a user located at a reference location, a first model and a second model;
   obtain, when the user views the images presented by the electronic device, an image of the user captured by a camera of the electronic device;
   determine a line between two eyes of the user from the image of the user;
   calculate an offset angle between the line and a vertical axis of the electronic device;
   calculate coordinates of a middle point of the line;
   calculate a length of the line;
   generate a third model according to the offset angle, the coordinates of the middle point of the line, and the length of the line; and
   adjust, when the third model does not match the first model, the images presented by the electronic device according to the second model and the offset angle;
   wherein the first model is generated when three conditions are satisfied as following: (1) a reference line between the two eyes of the user is parallel to an abscissa axis of the electronic device, and vertical to a vertical axis of the electronic device; (2) coordinates of a reference middle point of the reference line are predetermined; (3) a length of the reference line is predetermined;
   wherein the second model is generated when three conditions are satisfied as following: (1) a reference horizontal line of the images presented by the electronic device is parallel to the abscissa axis of the electronic device, and vertical to the vertical axis of the electronic device; (2) a reference central point of the images presented by the electronic device is predetermined; (3) a length of a reference diagonal line of the images presented by the electronic device is predetermined; and
   wherein the images presented by the electronic device are adjusted when three conditions are satisfied as following: (1) $L'(t)/L'0=k*L0/L(t)$, wherein $L'(t)$ is a length of an adjusted diagonal line of the images presented by the electronic device, $L'0$ is the length of the reference diagonal line of the images presented by the electronic device, $L0$ is the length of the reference line between the two eyes of the user, $L(t)$ is the length of the line between the two eyes of the user, and k is a constant value; (2) $\theta'(t)=\theta(t)$, wherein $\theta'(t)$ is an adjusted angle, and $\theta(t)$ is the offset angle between the line and the vertical axis of the electronic device; (3) $P'(x(t), y(t))-P'0=P(x(t), y(t))-P0$, wherein $P'(x(t), y(t))$ is an adjusted central point of the images presented by the electronic device, $P'0$ is the reference central point of the images presented by the electronic device, $P(x(t), y(t))$ is the middle point of the line, and $P0$ is the reference middle point of the reference line.

2. The electronic device of claim 1, wherein an adjustment of the images presented by the electronic device is triggered when the offset angle is greater than a predetermined value.

3. The electronic device of claim 1, wherein an adjustment of the images presented by the electronic device is triggered when a time between two adjustments of the images presented by the electronic device is greater than a predetermined time.

4. A computer-based method for adjusting images of an electronic device, the method comprising:
   generating a first model and a second model when the images presented by the electronic device are viewed by a user located at a reference location;
   obtaining images of the user captured by a camera of the electronic device when the user views the images presented by the electronic device;
   determining a line between two eyes of the user from the images of the user;
   calculating an offset angle between the line and a vertical axis of the electronic device, coordinates of a middle point of the line, and a length of the line;
   generating a third model according to the offset angle, the coordinates of the middle point of the line, and the length of the line; and
   adjusting the images presented by the electronic device according to the second model and the offset angle when the third model does not match the first model;
   wherein the first model is generated when three conditions are satisfied as following: (1) a reference line between the two eyes of the user is parallel to an abscissa axis of the electronic device, and vertical to a vertical axis of the electronic device; (2) coordinates of a reference middle point of the reference line are predetermined; (3) a length of the reference line is predetermined;
   wherein the second model is generated when three conditions are satisfied as following: (1) a reference horizontal line of the images presented by the electronic device is parallel to the abscissa axis of the electronic device, and vertical to the vertical axis of the electronic device; (2) a reference central point of the images presented by the electronic device is predetermined; (3) a length of a reference diagonal line of the images presented by the electronic device is predetermined; and
   wherein the images presented by the electronic device are adjusted when three conditions are satisfied as following: (1) $L'(t)/L'0=k*L0/L(t)'$, wherein (t) is a length of an adjusted diagonal line of the images presented by the electronic device, $L'0$ is the length of the reference diagonal line of the images presented by the electronic device, $L0$ is the length of the reference line between the two eyes of the user, $L(t)$ is the length of the line between the two eyes of the user, and k is a constant value; (2) $\theta'(t)=\theta(t)$, wherein $\theta'(t)$ is an adjusted angle, and $\theta(t)$ is the offset angle between the line and the vertical axis of the electronic device; (3) $P'(x(t), y(t))-P'0=P(x(t), y(t))-P0$, wherein $P'(x(t), y(t))$ is an adjusted central point of the images presented by the electronic device, $P'0$ is the reference central point of the images presented by the electronic device, $P(x(t), y(t)) is the middle point of the line, and P0 is the reference middle point of the reference line.

5. The method of claim 4, wherein an adjustment of the images presented by the electronic device is triggered when the offset angle is greater than a predetermined value.

6. The method of claim 4, wherein an adjustment of the images presented by the electronic device is triggered when a time between two adjustments of the images presented by the electronic device is greater than a predetermined time.

7. A non-transitory computer-readable medium having stored thereon instructions that, when executed by at least one processor of an electronic device, causing the processor to perform a method for adjusting images presented by the electronic device, the method comprising:

generating a first model and a second model when the images presented by the electronic device are viewed by a user located at a reference location;

obtaining images of the user captured by a camera of the electronic device when the user views the images presented by the electronic device;

determining a line between two eyes of the user from the images of the user;

calculating an offset angle between the line and a vertical axis of the electronic device, coordinates of a middle point of the line, and a length of the line;

generating a third model according to the offset angle, the coordinates of the middle point of the line, and the length of the line; and adjusting the images presented by the electronic device according to the second model and the offset angle when the third model does not match the first model;

wherein the first model is generated when three conditions are satisfied as following: (1) a reference line between the two eyes of the user is parallel to an abscissa axis of the electronic device, and vertical to a vertical axis of the electronic device; (2) coordinates of a reference middle point of the reference line are predetermined; (3) a length of the reference line is predetermined;

wherein the second model is generated when three conditions are satisfied as following: (1) a reference horizontal line of the images presented by the electronic device is parallel to the abscissa axis of the electronic device, and vertical to the vertical axis of the electronic device; (2) a reference central point of the images presented by the electronic device is predetermined; (3) a length of a reference diagonal line of the images presented by the electronic device is predetermined; and wherein the images presented by the electronic device are adjusted when three conditions are satisfied as following: (1) L'(t)/L'0=k*L0/L(t), wherein L'(t) is a length of an adjusted diagonal line of the images presented by the electronic device, L'0 is the length of the reference diagonal line of the images presented by the electronic device, L0 is the length of the reference line between the two eyes of the user, L(t) is the length of the line between the two eyes of the user, and k is a constant value; (2) θ'(t)=θ(t), wherein θ'(t) is an adjusted angle, and θ(t) is the offset angle between the line and the vertical axis of the electronic device; (3) P'(x(t), y(t))–P'0=P(x(t), y(t))–P0, wherein P'(x(t), y(t)) is an adjusted central point of the images presented by the electronic device, P'0 is the reference central point of the images presented by the electronic device, P(x(t), y(t)) are the middle point of the line, and P0 is the reference middle point of the reference line.

8. The non-transitory computer-readable medium of claim 7, wherein an adjustment of the images presented by the electronic device is triggered when the offset angle is greater than a predetermined value.

9. The non-transitory computer-readable medium of claim 7, wherein an adjustment of the images presented by the electronic device is triggered when a time between two adjustments of the images presented by the electronic device is greater than a predetermined time.

* * * * *